United States Patent [19]

Laurent et al.

[11] Patent Number: 5,724,311
[45] Date of Patent: Mar. 3, 1998

[54] METHOD AND DEVICE FOR THE LONG-TERM SEISMIC MONITORING OF AN UNDERGROUND AREA CONTAINING FLUIDS

[75] Inventors: Jean Laurent, Orgeval; Frédéric Huguet, Epinay-Sur-Seine, both of France

[73] Assignees: Institut Francais du Petrole, RueilMalmaison, France; Gaz De France, Paris, France

[21] Appl. No.: 700,373

[22] PCT Filed: Dec. 22, 1995

[86] PCT No.: PCT/FR95/01722

§ 371 Date: Aug. 26, 1996

§ 102(e) Date: Aug. 26, 1996

[87] PCT Pub. No.: WO96/21165

PCT Pub. Date: Jul. 11, 1996

[30] Foreign Application Priority Data

Dec. 29, 1994 [FR] France ................. 94 15835

[51] Int. Cl.⁶ .................. G01V 1/40; G01V 1/28
[52] U.S. Cl. .................. 367/57; 367/25; 367/77; 181/106; 181/111; 181/401
[58] Field of Search .................. 367/25, 37, 57, 367/761, 77; 181/106, 401

[56] References Cited

U.S. PATENT DOCUMENTS

| | | | |
|---|---|---|---|
| 2,745,507 | 5/1956 | Bodie | 367/56 |
| 3,268,028 | 8/1966 | Oulla | 367/56 |
| 4,009,609 | 3/1977 | Sayer | 73/152 |
| 4,597,464 | 7/1986 | Chelmiski | 181/401 |
| 4,800,538 | 1/1989 | Paamore | 181/111 |
| 5,187,332 | 2/1993 | El-Raba et al. | 181/122 |
| 5,243,562 | 9/1993 | Laurent et al. | 367/25 |
| 5,303,773 | 4/1994 | Czernichow et al. | 166/250 |
| 5,355,952 | 10/1994 | Meynier | 166/250 |
| 5,461,594 | 10/1995 | Mougenot et al. | 367/48 |

FOREIGN PATENT DOCUMENTS

| | | |
|---|---|---|
| 1475622 | 2/1967 | France . |
| 2185574 | 3/1990 | United Kingdom . |

Primary Examiner—Nelson Moskowitz
Attorney, Agent, or Firm—Antonelli, Terry, Stout, & Krauss, LLP

[57] ABSTRACT

Within the scope of operations of long-term regular monitoring of an underground area, a seismic emission-reception device is installed in a fixed position on the production site, so as to have time stable operating conditions of identical emission-reception locations, identical quality of coupling with the formations, etc. The device includes a plurality of seismic sources (S1 ... Sn) in fixed places at the surface or buried beneath the surface, on either side of a production well (1), and at least one array of receivers (R) set in a fixed position at the surface or in at least one well. Explosive sources, hydraulic overpressure sources, electromechanical sources, etc, can be used and connected to a plant (3) providing energy using an explosive gaseous mixture, which may be a constituent taken from the monitored area, fluid under pressure transmitting hydraulic shocks or vibrations, etc, by means of buried pipes or cables (2). The feeding and the triggering thereof are controlled by a central control and recording station (4). The method and device can for example be used for the filling of an underground gas storage reservoir.

21 Claims, 2 Drawing Sheets

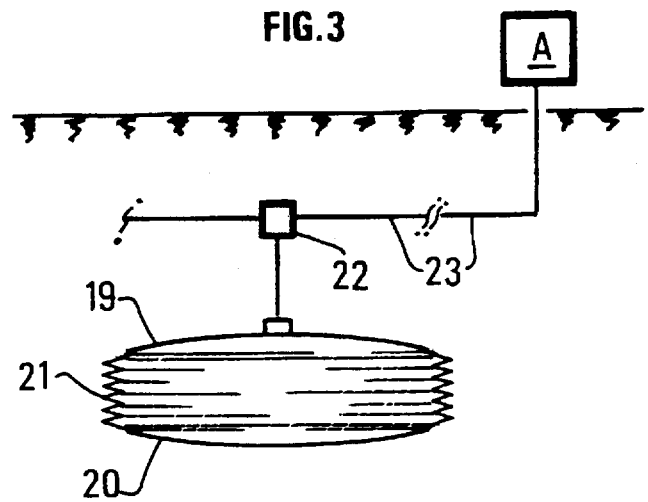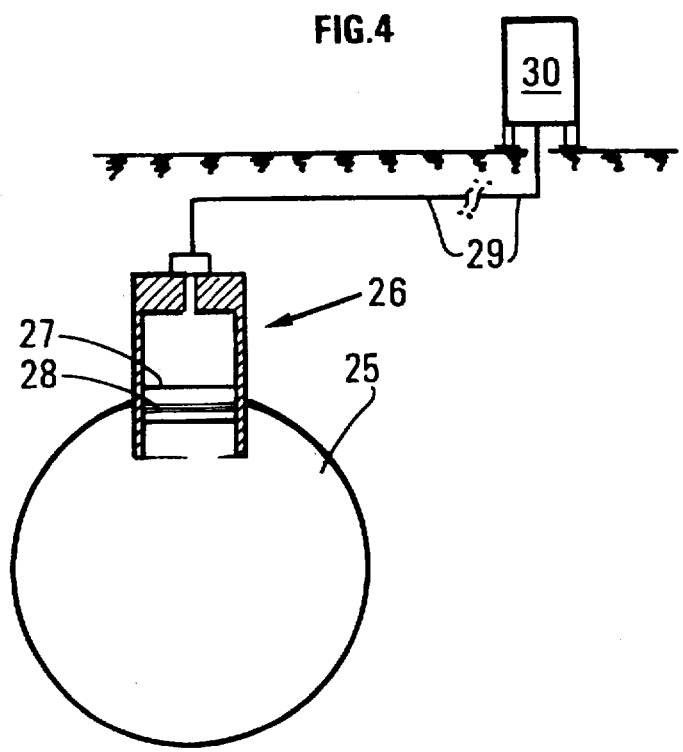

METHOD AND DEVICE FOR THE LONG-TERM SEISMIC MONITORING OF AN UNDERGROUND AREA CONTAINING FLUIDS

BACKGROUND OF THE INVENTION

1. Field of the Invention

The present invention relates to a method for the long-term seismic monitoring of an underground area containing fluids and more particularly of an underground gas storage reservoir.

2. Description of the Prior Art

It is well-known to test the filling of an underground reservoir intended for the storage of natural gas at successive times of its loading, by means of a seismic system including a vibrator or an impulsive source for applying disturbances to the ground surface and a reception device comprising alignments of sensors arranged at the surface or in a well and coupled with the ground. As the injection of gas significantly changes the speed of sound, the density and therefore the acoustic impedance of the reservoir formation, the variations of the time interval between two reflectors, one being placed above, the other below the reservoir, can be determined on the seismic records. The filling evolution can also be monitored by measuring the amplitude variation of the waves reflected at successive times at the level of the reservoir layers at successive times of the filling.

BACKGROUND OF THE INVENTION

The published French patent applications 2,593,292; 2,642,849; 2,656,034; 2,688,896 and 2,689,647 notably describe systems including one or several servicing arrays installed in a fixed position in wells connected to the surface by one or several transmission channels. These servicing arrays can be seismic receivers and also possibly be one or several seismic wave sources arranged in wells. The arrays of receivers or emitters can be placed outside casing pipes. They are coupled with the surrounding formations by the cement injected into the annular space around these pipes after they have been set.

The arrays of receivers can also be associated with a tubing lowered into a well and coupled with the formations surrounding the well by means of a casing pipe for example.

Subsurface seismic exploration is generally performed by coupling seismic sources and receivers with the ground according to different combinations where the sources and/or the receivers are arranged at the surface or close thereto or in one or several wells through the formation explored.

French patent applications 2,703,457; 2,703,470 and 2,674,029 describe methods of seismic monitoring of underground reservoirs by means of arrays of receivers placed in wells and of seismic sources placed at the ground surface or possibly in these wells. A method of seismic monitoring of a gas storage reservoir is also described for example by E. Blondin et al in Geophysical Prospecting 34, 73–93, 1986.

A series of seismic emission-reception cycles are performed by changing the time of activation of a seismic source in relation to the axis of the well where the arrays of receivers are installed, according to the so-called "walk-away" technique, and by recording the time arrivals at receivers R1 to Rn as a function of the time of transit t of sound thereto. The source can be shifted along a radial axis OX and a two-dimensional seismic display (X,t) or (X,Z) is obtained. It can also be shifted all around the well so as to obtain a 3D seismic display (X,Y,t) or (X,Y,Z), Z standing for the depth, axis OY being perpendicular to OX and OZ. In practice, the source S can be shifted on either side of the well over a distance (or a radius) of the same order of magnitude as the underground area to be monitored.

Deposit monitoring and gas storage reservoir filling are generally long-lasting operations. The volume variations of the gas bubbles stored for example, due to later samplings, are slow. The seismic monitoring operations are often spaced out in time. In practice, the surface seismic equipment has to be reinstalled at each new seismic recording session and the emission conditions of the previous seismic operations preferably have to be reproduced.

Reinstallations are not always possible. For the production of a deposit or of a storage reservoir, various installations and material are set and the site is enclosed. It may also happen that the initial facilities have to be changed, that the site is modified (clearing, banking), that concrete slabs are poured, etc, which may disturb the transmission of the seismic waves emitted or change the coupling of the source with the ground and thus lead to a variation in the emission quality. The state of congestion of the site and its fences can prevent the seismic source used from being shifted. The changes and developments brought between two successive deposit or reservoir monitoring periods can also prevent the seismic emission-reception system from being set in the same places.

SUMMARY OF THE INVENTION

The method according to the invention allows the obtaining of a perfect reproducibility of the operating conditions in the repetitive operations of seismic monitoring of an underground area crossed by at least one well or wellbore, notably of an underground gas storage reservoir. The method comprises setting at least one array of seismic receivers in a fixed position. The method comprises:

installing, for the duration of the area monitoring, several repetitive seismic sources of the same type in fixed places in relation to the position of the well, as well as a permanent linking network for the selective energy supply of these sources; and setting a central station intended for the selective remote control of each of these seismic sources by means of this permanent linking network, and for recording the seismic signals coming from the underground area in response to the seismic waves transmitted selectively in the ground by the seismic sources.

At least part of the seismic sources and the linking network can be buried or permanently installed at the surface, and associated with at least one array of receivers that is permanently coupled with the ground at the surface or with the wall of at least one well crossing the underground area.

The method can comprise for example using the seismic records performed for the monitoring of an underground fluid storage reservoir.

By means of this array of fixed sources whose coupling with the surrounding formations remains stable, and of this at least partly buried supply network whose surface coverage area is reduced, a whole series of seismic monitoring operations can be carried out under stable operating conditions without any risk of incompatibility with the activities of the production site.

The seismic monitoring device for monitoring an underground area crossed by at least one well or wellbore according to the invention includes at least one array of seismic receivers coupled with the underground area at the surface or in the neighbourhood thereof, or in at least one well.

The invention comprises several repetitive seismic sources of the same type installed in a fixed position in relation to the position of the well (buried or at the surface), a unit supplying the sources with energy, a permanent linking network (buried or at the surface) between the supply unit and the various seismic sources for supplying them selectively with energy, and a central station including means for the selective remote control of each of these repetitive seismic sources, as well as a system for recording the seismic signals coming from the underground area, received by this array of receivers in response to the seismic waves transmitted selectively in the ground by the seismic sources.

The device can comprise switching elements controlled by the central station for the selective energy supply of the various sources.

The device comprises for example seismic sources suited to create disturbances through the explosion of a mixture of fluid constituents in a chamber in contact with the formation, as well as an explosive mixture supply unit, and this mixture can be made from a fluid extracted from the underground area, notably from a gas stored in the underground reservoir monitored.

The sources can also comprise each an elastically deformable buried enclosure filled with liquid, the supply network being in this case filled with liquid and the supply unit comprising means for creating impulse overpressures in the liquid.

It is also possible to use for example sources comprising each a buried enclosure filled with fluid and an assembly for applying vibrations to the fluid in the enclosure, this assembly comprising a cylinder opening onto the inside of the sphere and communicating by a connection means with a remote vibrator, and a piston mounted sliding in the cylinder for applying vibrations to the fluid of the sphere.

An array of receivers installed in a fixed position in one or several wells crossing the underground area can for example be associated with these sources.

In the case where the device is used for monitoring an underground fluid storage reservoir, it comprises means for processing the records allowing possible variations undergone by the reservoir to be detected.

BRIEF DESCRIPTION OF THE DRAWINGS

Other features and advantages of the method and of the device according to the invention will be clear from reading the description hereafter of embodiments given by way of non limitative example, with reference to the accompanying drawings in which:

FIG. 3 shows a second example of an impulsive source that can also be used; and

FIG. 4 shows a third example of a vibratory type source that can also be used.

DESCRIPTION OF THE PREFERRED EMBODIMENTS

Figure 1:
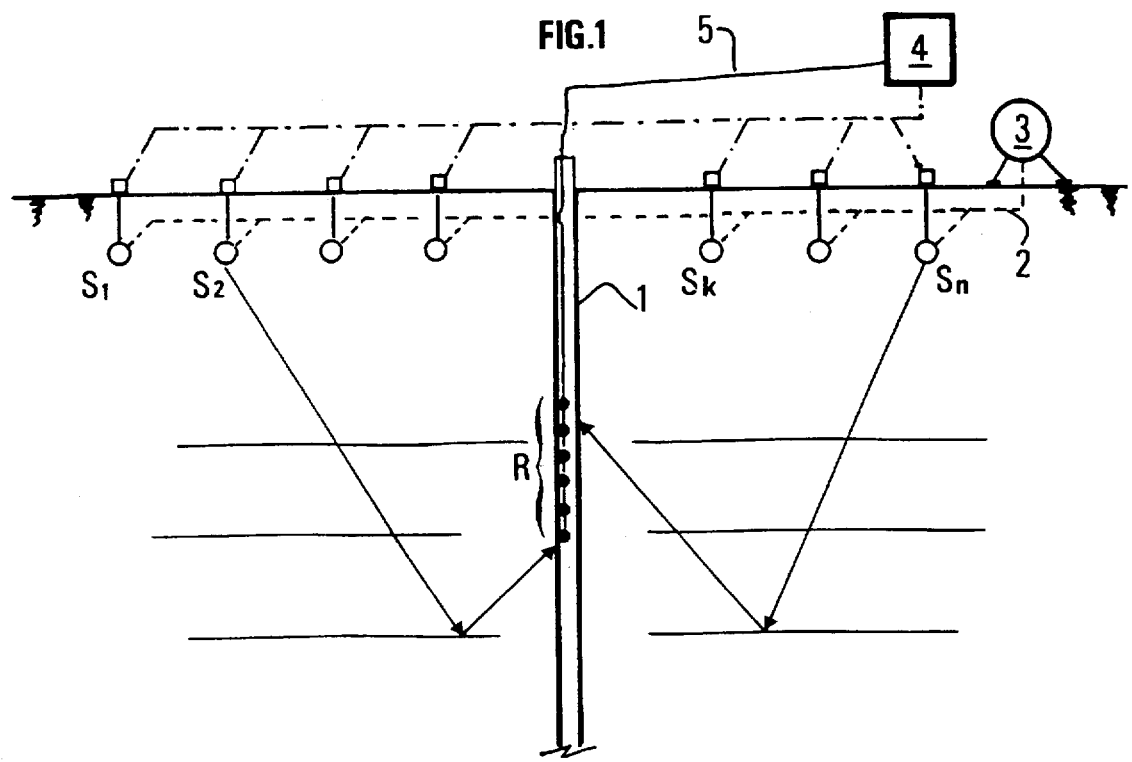
FIG. 1 diagrammatically shows an embodiment of the the present invention.

The device according to the invention can be installed permanently on a production site of an underground area containing fluids, whether it is a petroliferous deposit made to produce or a gas storage reservoir, under conditions allowing the reproducibility of seismic area monitoring operations.

It comprises for example an array of several seismic wave sources S1, S2, ... Sk, ... Sn of a well-known type, emitting vibrations or pulses, which are installed in a fixed position at the surface of the ground or in the neighbourhood thereof, so that the acoustic coupling of each of them with the ground remains substantially constant for the total scheduled duration of the reservoir monitoring. These sources are for example aligned on either side of a well 1 drilled through the area to be monitored, in one or several axial directions.

These sources are preferably buried in the ground at a determined depth. One or several links 2 allow the sources to be supplied with energy, that can be one or several lines for fluids or electric cables, which are also buried. These links connect sources S1 to Sn to a suitable supply unit 3 by means of a control allowing selective energy transfer to the various seismic sources.

The sources can also be installed in a fixed position at the surface of the ground, on a cemented baseplate for example, so that their coupling with the ground remains substantially constant.

The device also comprises at least one array of seismic receivers R permanently installed in contact with the area to be monitored. This array of receivers R can be installed for example in well 1 or in another well as described in the above-mentioned patents, so as to leave it clear for other activities, or possibly buried in the ground or in the neighbourhood of the surface. The array of receivers R can be connected to a central control and recording station 4 by means of linking cables 5. This station is provided with a remote control allowing the selective triggering of each of the sources.

Such a layout of seismic sources and receivers in permanent and close contact with the formations makes it possible to perform reproducible seismic monitoring sessions. The operating conditions remaining the same, the comparison of the data obtained at the end of the successive sessions provides precise results on the long-term evolution of the area monitored.

The sources are placed at regular intervals from one another over a given distance on either side of the well, which is for example of the same order of magnitude as the depth of the underground area to be monitored. So-called walkaway operations can thus be performed by operating successively the various sources, and by collecting each time the signals are received by the array of sensors.

For a surface installation, any well-known seismic source emitting vibrations or pulses can be used and closely coupled with the ground.

In the case where it is desired to monitor the underground reservoir with buried sources, the embodiments described hereafter can for example be used.

Figure 2:
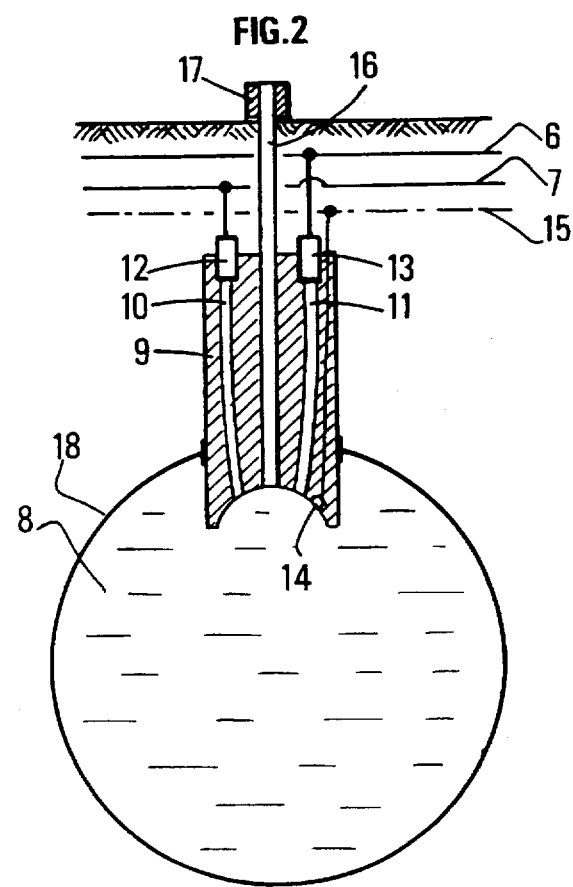
FIG. 2 shows a first example of an explosive source that can be coupled with the ground surface or buried.

The source schematized in FIG. 2 for example is an explosion source similar to that described in the addition No. 93,151 to French patent 1,475,622. It works through the ignition of an explosive mixture made from two components separately fed thereto through buried lines 6 and 7. This source comprises a perforated sphere 8 into which penetrates a supply sleeve 9. Inner channels 10 and 11 cross it right through and connect the inside of sphere 8 to the buried lines 6 and 7. The injection of the constituents into the sphere is remote controlled from control station 4 (FIG. 1) by means of solenoid valves 12 and 13. The ignition of the mixture is provided by a distributor 14 controlled in the same way. An electric cable 15, also buried, allows distributor 14 and solenoid valves 12, 13 to be controlled. An air pipe 16 provided with a control valve allows the burnt gases to escape after each triggering. Sphere 8 is placed in an elastic casing 18 and buried in the ground.

In the case where explosive type sources are used for monitoring an underground site containing substances that can be used to form totally or partly the explosive mixture (gas storage reservoir, petroliferous reservoir, etc), the supply network 6, 7 can be communicated with a storage reserve (not shown) supplied from this reservoir.

It is also possible to use for example a source (FIG. 3) have two rigid plates 19 and 20 joined on the periphery thereof by an elastically deformable element 21. This enclosure is filled with liquid and can communicate, by means of a control solenoid valve 22, with a buried line 23 connected to a hydraulic accumulator 24 under pressure. By means of an intermittent opening of control valve 22 from control station 4 (FIG. 1), a water hammer and consequently the transmission in the ground of strong seismic pulses can be produced.

It is also possible to use a vibrating source having for example (FIG. 4) a deformable enclosure 25 filled with liquid in which a cylinder 26 is inserted. A piston 27 provided with seals 28 is mounted sliding in cylinder 26 that communicates through a line 29 with a remote vibrator 30 placed under the control of the same control station 4 (FIG. 1).

In the case where the underground area is an underground fluid storage reservoir for example, the central station can also comprise a processor for processing the records allowing the dection of possible variations undergone of the reservoir between two successive sessions of seismic reservoir monitoring.

The previous examples are of course not limitative.

We claim:

1. A seismic monitoring method for periodically sensing state variations of an underground reservoir over an operating time of use of the reservoir storing a fluid, the reservoir being crossed by at least one operating well, the method comprising:
   permanently installing, for the operating time, a plurality of repetitive seismic sources positioned in fixed places with respect to a mouth of the well and a buried linking network connected with a feeding device for selectively supplying energy to the seismic sources;
   permanently setting in a fixed position at least one array of seismic receivers; and
   periodically connecting a central control and recording unit to the seismic sources through the buried linking network and to the at least one array of seismic receivers for sensing the state variations including selective remote control of each of the seismic sources through the buried linking network and recording seismic signals sensed by the at least one array of seismic receivers in response to seismic waves transmitted selectively in the ground by the seismic sources.

2. A method as claimed in claim 1, wherein at least part of the repetitive seismic sources are buried.

3. A method as claimed in claim 1, wherein at least part of the repetitive seismic sources are permanently coupled with the ground.

4. A method as claimed in claim 2, wherein at least part of the repetitive seismic sources are permanently coupled with the ground.

5. A method as claimed in claim 1, wherein at least one array of receivers is permanently coupled with the ground at the surface.

6. A method as claimed in claim 2, wherein at least one array of receivers is permanently coupled with the ground at the surface.

7. A method as claimed in claim 3, wherein at least one array of receivers is permanently coupled with the ground at the surface.

8. A method as claimed in claim 4, wherein at least one array of receivers is permanently coupled with the ground at the surface.

9. A method as claimed in claim 1, wherein at least one array of receivers is permanently coupled with the wall of at least one other well.

10. A method as claimed in claim 2, wherein at least one array of receivers is permanently coupled with the wall of at least one other well.

11. A method as claimed in claim 3, wherein at least one array of receivers is permanently coupled with the wall of at least one other well.

12. A seismic monitoring system for periodically sensing state variations of an underground reservoir over an operating time of use of the reservoir for storing a fluid, the reservoir being crossed by at least one operating well, comprising:
   at least one array of seismic receivers placed in a fixed position;
   a plurality of repetitive seismic sources positioned in fixed places with respect to a mouth of the well;
   an energy feeder;
   a buried linking network for selectively connecting the energy feeder to the seismic sources;
   a control and recording unit; and
   means for periodically connecting the control and recording unit to the buried linking network and the at least one array of seismic receivers for performing sensing operations over the operating time, the control and recording unit including switching elements controlled by the central control and recording unit for selectively controlling each of the seismic sources through the buried linking network and for recording seismic signals sensed by the at least one array of seismic receivers in response to seismic waves transmitted selectively in the ground by the seismic sources.

13. A system as claimed in claim 12, wherein at least a part of the seismic sources are buried.

14. A system as claimed in claim 12, wherein at least part of the seismic sources are coupled with the ground at fixed positions.

15. A system as claimed in claim 13, wherein at least part of the seismic sources are coupled with the ground at fixed positions.

16. A system as claimed in claim 8, further comprising:
   at least one seismic source including a vessel provided with a deformable wall for contact with the ground, the energy feeder including a supply unit for delivering an explosive mixture, control valves within the buried linking network and igniters, the valves and igniters being under control of the control and recording unit for igniting the explosive mixture.

17. A system as claimed in claim 16, wherein the supply unit comprises means for supplying the buried linking network with a fluid constituent from the underground reservoir.

18. A system as claimed in claim 12, further comprising:

at least one source including an elastically deformable buried enclosure filled with liquid, the buried linking network being filled with the liquid, the energy feeder comprising elements for creating impulse overpressures in the liquid.

19. A system as claimed in claim 12, further comprising:

at least one source with a buried enclosure filled with a liquid, a cylinder opening into the enclosure, a piston freely slidable in the cylinder, the energy feeder comprising a vibrator and the buried linking network including lines filled with a liquid for transmitting vibrations from the vibrator to the piston.

20. A system as claimed in claim 12, further comprising:

at least one array of receivers permanently installed in the operating well.

21. A system as claimed in claim 12, wherein the control and recording unit includes a processor for detecting variations undergone from the underground reservoir.

* * * * *